(No Model.)

S. T. GREEN & L. M. HEALD.
PLOW.

No. 283,236. Patented Aug. 14, 1883.

WITNESSES.
W. J. Osgood

INVENTOR.
Salmon T. Green
Lucinda M. Heald
by Howard A. Snow ATT'Y.

(No Model.) 2 Sheets—Sheet 2.
S. T. GREEN & L. M. HEALD.
PLOW.
No. 283,236. Patented Aug. 14, 1883.
FIG. 3. FIG. 4.
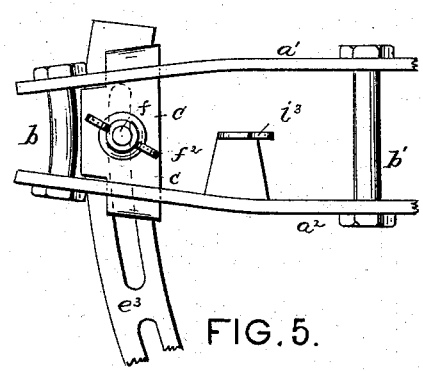
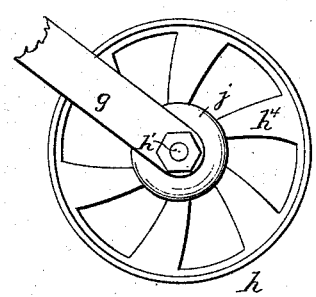
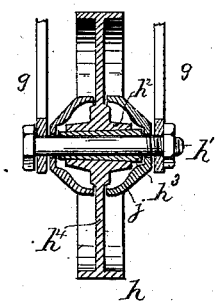
FIG. 5.
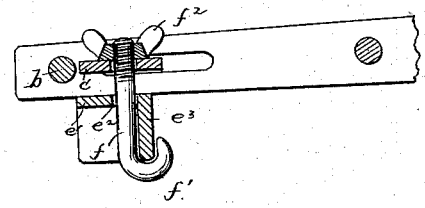
FIG. 6.
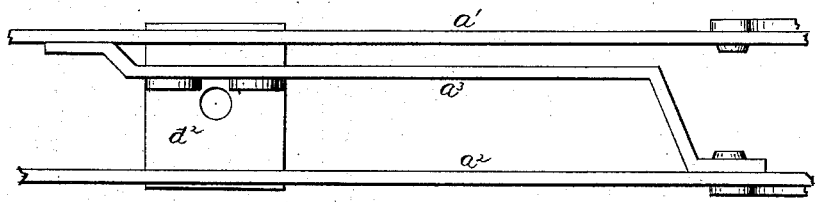
FIG. 7.
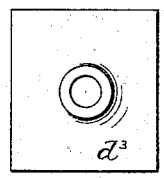
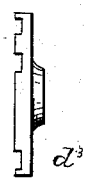
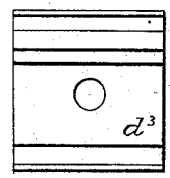
WITNESSES.
W. J. Osgood
P. Prutz
INVENTOR.
Salmon T. Green
Lucinda M. Heald
by Howard A. Snow ATT'Y.

UNITED STATES PATENT OFFICE.

SALMON T. GREEN AND LUCINDA M. HEALD, OF CHARLOTTE, MICHIGAN.

PLOW.

SPECIFICATION forming part of Letters Patent No. 283,236, dated August 14, 1883.

Application filed February 2, 1883. (No model.)

*To all whom it may concern:*

Be it known that we, SALMON T. GREEN and LUCINDA M. HEALD, citizens of the United States of America, residing at Charlotte, in the county of Eaton and State of Michigan, have invented certain new and useful Improvements in Plows, of which the following is a specification, reference being had therein to the accompanying drawings.

This invention relates to improvements in plows; and it consists in the construction, combination, and arrangement of the several parts, as will be hereinafter fully described, and pointed out in the claims.

Figure 1:
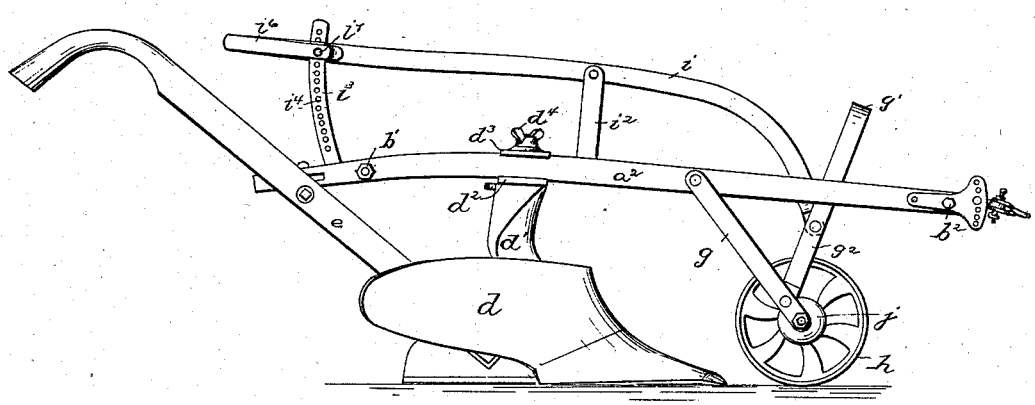

In the drawings, Figure 1 is a side view, and Fig. 2 a plan view, of a plow constructed according to our invention; and Figs. 3, 4, 5, 6, and 7 are detail views, as will be described.

Figure 2:
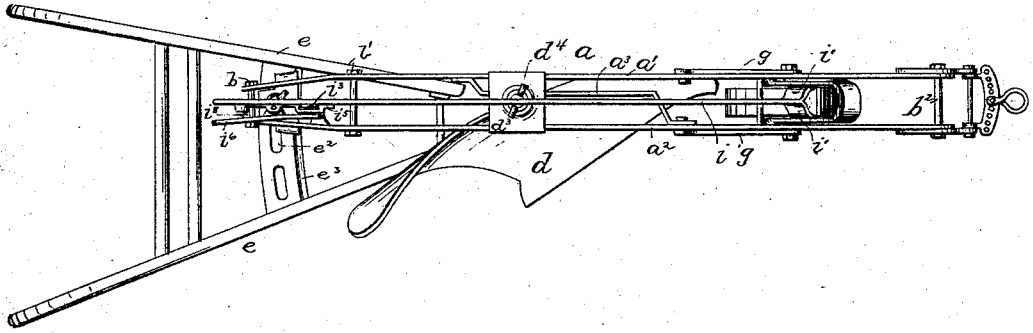

$a$ is the plow-beam, consisting of the two bars $a'$ $a^2$, connected by bolts $b$ $b'$ $b^2$ and braced by the bar $a^3$, all arranged as shown in Figs. 1 and 2.

$c$ is a horizontal plate secured between the bars $a$ $a'$, near the rear end of the latter, and provided with a hole, $c'$, for the passage of the hook clamping bolt, hereinafter described.

$d$ is the plow; $d'$, the standard of same, which is secured to the beam $a$ by plates $d^2$ $d^3$ and set-screw $d^4$, whereby the beam may be set at any suitable angle on the standard as may be desired to serve a wide or narrow furrow, the beam being held at the desired angle by the hook-bolt, &c., hereinafter described.

$e$ are the handles, having their lower ends secured to the plow, as shown.

$e'$ is a plate secured to and extended between the handles, and arranged immediately under the plate $c$, secured to the beam. This plate $e'$ is arranged at a proper height, so that the beam can rest against and slide on it in the operation of the device, as will be understood from Fig. 5.

$e^2$ are elongated openings through plate $e'$.

$e^3$ is a plate bent from or secured to plate $e'$ and arranged at right angles thereto, as shown in Fig. 5.

$f$ is a hook-bolt, having its lower end turned to form the hook $f'$, and its upper end is threaded to receive the thumb-nut $f^2$. The hook $f'$ catches under the edge of the plate $e^3$, and its upper end is passed through the openings $e^2$ $c'$, and the nut $f^2$ turns down against the plate $c$. By this construction it will be seen that when the beam is turned to the angle desired it may be securely held in position.

$g$ $g$ are bars having their upper ends pivoted to the plow-beam.

$h$ is a wheel journaled on rod $h'$, extended between the lower ends of the bars $g$.

$g'$ is a bar bent to form the arms $g^2$, the lower ends of which are pivoted to the bars $g$, near the rod $h'$, as shown in Fig. 1.

$i$ is a lever having its forward end bifurcated to form the arms $i'$, which are pivoted to the arms $g^2$, and it is extended back, fulcrumed on the standard $i^2$, and has its rear end extended nearly to the handles $e$, and in convenient reach of the operator.

$i^3$ is a bar projected upward from the beam, near the rear end of the same, and perforated with a series of holes, $i^4$.

$i^5$ is a loop formed on lever $i$, and arranged to slide on the bar $i^3$, as shown in Fig. 2.

$i^6$ is a hand-lever, pivoted on lever $i$, and having one end provided with a pin, $i^7$, arranged to enter holes $i^4$ and hold the lever $i$ at any point desired.

$i^8$ is a coil-spring bearing between the handle of lever $i^6$ and the lever $i$.

The wheel $h$ is constructed with the hub $h^2$, extended to either side, as shown, and the boxing $h^3$ and spokes $h^4$, and is journaled on a suitable bearing, $h'$, properly supported, as shown.

$j$ $j$ are caps placed on the bearing-bolt $h'$, covering the hubs $h^2$, and having their edges arranged close to the sides of the spokes, preventing the ingress of sand, dirt, &c., and keeping the bearings free from clog.

The parts, being made as described and shown, can readily be replaced when broken or worn.

By means of the lever, the wheel, and the connections, as described, the plow can readily be set at any desired depth without a moment's delay or stopping of the team, and the weight can readily be thrown on the wheel when it is desired to convey the plow from point to point or to turn a corner, the throwing of the wheel down elevating the whiffle-tree clear of the horses' heels while turning. The bars $g$ $g$ are so arranged as to support the wheel firmly, and at the same time give a prompt action on the operation of the lever $i$.

What we claim as our invention, and desire to secure by Letters Patent, is—

1. In a plow, the combination, with the standard, of a beam consisting of bars $a'$ $a^2$, suitably braced together and pivotally secured to the standard, a slotted plate, $e^3$, secured between the plow-handles, a hook-bolt, $f$, thumb-nut $f^2$, and a plate, $c$, substantially as set forth.

2. In a plow, the combination, with the bars $a'$ and $a^2$, of the bars $g$ and $g'$ and arms $g^2$, the lever $i$ and its securing devices, and the wheel $h$ and its guard-caps $j$, secured over the hubs of the wheels and between the arms $g^2$, substantially as set forth.

In testimony whereof we affix our signatures, in presence of two witnesses, this 4th day of December, 1882.

SALMON T. GREEN.
    LUCINDA M. HEALD.

Witnesses:
 H. M. SHERMAN,
 J. E. GREEN.